US008605591B2

(12) United States Patent
Shaffer et al.

(10) Patent No.: US 8,605,591 B2
(45) Date of Patent: Dec. 10, 2013

(54) SYSTEM AND METHOD FOR OPTIMIZING PACKET ROUTING IN A MESH NETWORK (75) Inventors: Shmuel Shaffer, Palo Alto, CA (US); Charles I. Okwudiafor, Fremont, CA (US); Sandeep J. Shetty, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 443 days.

(21) Appl. No.: 12/968,123

(22) Filed: Dec. 14, 2010

(65) Prior Publication Data

US 2012/0147746 A1 Jun. 14, 2012

(51) Int. Cl.
H04L 12/28 (2006.01)

(52) U.S. Cl.
USPC .......................... 370/235; 370/412

(58) Field of Classification Search
None
See application file for complete search history.

(56) References Cited

U.S. PATENT DOCUMENTS

| | | | | |
|---|---|---|---|---|
| 5,224,099 | A | * | 6/1993 | Corbalis et al. ............... 370/412 |
| 5,311,418 | A | | 5/1994 | Lalander |
| 5,390,068 | A | | 2/1995 | Schultz et al. |
| 6,212,164 | B1 | * | 4/2001 | Murakami et al. ............ 370/230 |
| 6,501,628 | B1 | | 12/2002 | Namba et al. |
| 6,859,435 | B1 | * | 2/2005 | Lee et al. ....................... 370/231 |
| 6,906,434 | B1 | | 6/2005 | Koeppe et al. |
| 7,013,347 | B1 | * | 3/2006 | Moen ............................ 709/238 |
| 7,508,173 | B2 | | 3/2009 | Zhou et al. |
| 7,564,789 | B2 | * | 7/2009 | Betker .......................... 370/235 |
| 7,953,088 | B2 | * | 5/2011 | Cheriton et al. .............. 370/392 |
| 7,965,681 | B2 | | 6/2011 | Berglund et al. |
| 2002/0087234 | A1 | | 7/2002 | Lof et al. |
| 2002/0105231 | A1 | | 8/2002 | Koeppe et al. |
| 2004/0167677 | A1 | | 8/2004 | Weiss |
| 2005/0174942 | A1 | * | 8/2005 | Betker .......................... 370/235 |
| 2006/0045011 | A1 | * | 3/2006 | Aghvami et al. ............. 370/230 |
| 2007/0002740 | A1 | * | 1/2007 | Evans et al. ................ 370/230.1 |
| 2007/0201365 | A1 | * | 8/2007 | Skoog et al. ............... 370/230.1 |
| 2008/0085702 | A1 | * | 4/2008 | Park et al. .................... 455/422.1 |
| 2008/0177678 | A1 | | 7/2008 | DiMartini et al. |
| 2010/0205281 | A1 | | 8/2010 | Porter et al. |
| 2010/0317317 | A1 | | 12/2010 | Maier et al. |

OTHER PUBLICATIONS

USPTO Jan. 4, 2013 Non-Final Office Action from U.S. Appl. No. 12/968,163.
USPTO Jan. 23, 2012 Non-Final Office Action from U.S. Appl. No. 12/710,284.
USPTO Apr. 23, 2012 Response to Jan. 23, 2012 Non-Final Office Action from U.S. Appl. No. 12/710,284.

(Continued)

Primary Examiner — Steven H Nguyen
(74) Attorney, Agent, or Firm — Patent Capital Group (57) ABSTRACT A method is provided in one example and includes receiving a first packet and a second packet that propagate in a mesh network and evaluating hop count metrics associated with the first packet and the second packet (e.g., evaluate the number of hops traversed in the mesh network, hop characteristics, etc.). The first packet is sent to a first queue, the second packet is sent to a second queue. The first queue is associated with a first hop count detected in the first packet, and the second queue is associated with a second hop count detected in the second packet. A buffer overflow condition can be identified. The method further includes discarding the second packet based on the second hop count being less than the first hop count. Discarding of the second packet may be performed in response to any type of congestion parameter detected in the mesh network.

17 Claims, 4 Drawing Sheets (56) References Cited

OTHER PUBLICATIONS

USPTO Jun. 21, 2012 Final Office Action from U.S. Appl. No. 12/710,284.
USPTO Sep. 18, 2012 RCE Response to Jun. 21, 2012 Final Office Action from U.S. Appl. No. 12/710,284.
U.S. Appl. No. 12/710,284, filed Feb. 22, 2010, entitled "System and Method for Providing Collaborating Power Controllers," Inventor: Shmuel Shaffer.
U.S. Appl. No. 12/968,163, ffiled Dec. 14, 2010, entitled "System and Method for Providing Configuration Data in a Mesh Network," Inventors: Shmuel Shaffer, et al.
Wikipedia, the free encyclopedia, "AC Power," 4 pages; printed from http://en.wikipedia.org/wiki/AC_power#Real.2C_reactive.2C_and_apparent_power on Feb. 22, 2010.
Cisco, "Bringing the SmartGrid into the Home: The Value of Home Energy Management for Utilities," Whitepaper, © 2010, 6 pages.
Digital Phase Converters—Phase Converter Information; 2 pages; printed from http://www.phaseconverterinfo.com/phaseconverter_digital.htm on Feb. 22, 2010.
Nokian Capacitors, Ltd., "DW-series detuned filter capacitor bank," 2 pages; EN-LV14-May 2007; www.areva-td.com.
American Superconductor, "Dynamic Reactive Power Compensation," 2 pages; © 2004; printed from http://www.amsc.com/documents/PES_SVR_01_0804a.pdf on Feb. 22, 2010.
J. Sangiamwong and T. Sugiyama, "Hidden Node Problem Aware Routing Metric for Wireless LAN Mesh Networks," $18^{th}$ Annual IEEE International Symposium on Personal, Indoor and Mobile Radio Communications (PIMRC'07), © 2007 IEEE, 5 pages.
Meshdynamics, Inc., "Meshdynamics Network Viewer User Guide," Network Viewer Release 9.0, © 2008, 57 pages; www.meshdynamics.com.
Wikipedia, the free encyclopedia, "Power Factor," 9 pages; printed from http://en.wikipedia.org/wiki/Power_factor on Feb. 22, 2010.
S&C Electric Company, "What is VAR Management?" 2 pages; Apr. 15, 2002; printed from http://www.sandc.com/webzine/2002/041502_1.asp on Feb. 22, 2010.
USPTO Mar. 29, 2013 Non-Final Office Action from U.S. Appl. No. 12/710,284.
USPTO Apr. 1, 2013 Response to Non-Final Office Action dated Jan. 4, 2013 from U.S. Appl. No. 12/968,163.
USPTO Jun. 28, 2013 Response to Mar. 29, 2013 Non-Final Office Action from U.S. Appl. No. 12/710,284.
USPTO Jun. 27, 2013 Final Office Action from U.S. Appl. No. 12/968,163.

\* cited by examiner

SYSTEM AND METHOD FOR OPTIMIZING PACKET ROUTING IN A MESH NETWORK

TECHNICAL FIELD

This disclosure relates in general to the field of packet management and, more particularly, to optimizing packet routing in a mesh network.

BACKGROUND

Mesh networks have gained notoriety because they are easy to use and because they can be quickly provisioned. Typically, a mesh network includes multiple types of devices that can relay information to each other and/or relay information toward a given destination. A wireless mesh network can provide a high-bandwidth network over a specific coverage area, while incurring minimal infrastructure costs. In many cases, the wireless mesh architecture mirrors a router network configuration, minus the cumbersome cabling between nodes. This is because peer radio devices in the mesh network do not have to be cabled or hardwired in the same way in which access points are provisioned. The ability to properly manage and coordinate packet routing in a mesh network provides a significant challenge to network operators, component manufacturers, service providers, and system administrators alike.

BRIEF DESCRIPTION OF THE DRAWINGS

To provide a more complete understanding of example embodiments and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving a first packet and a second packet that propagate in a mesh network and evaluating hop count metrics associated with the first packet and the second packet (e.g., evaluate the number of hops traversed in the mesh network, hop characteristics, etc.). The first packet is sent to a first queue and the second packet is sent to a second queue. The first queue is associated with a first hop count detected in the first packet, and the second queue is associated with a second hop count detected in the second packet. A buffer overflow condition can be identified. The method further includes discarding the second packet based on the second hop count being less than the first hop count. Discarding of the second packet may be performed in response to any type of congestion parameter detected in the mesh network.

In more specific implementations, the method can include receiving additional incoming packets, and designating a number of retransmissions associated with the incoming packets in proportion to a number of hops traversed in the mesh network by the incoming packets. In yet other implementations, the method can include receiving additional incoming packets, and communicating hop count information associated with the incoming packets in order to set an initial value of a retransmission timer for the incoming packets. The hop count information can be communicated from a mesh layer-2 (L2) to a transmission control protocol/Internet Protocol (TCP)/(IP) layer.

In yet other example implementations, the method can include receiving additional incoming packets, and providing a first portion of the incoming packets into an aggregated packet. A second portion of the incoming packets is not included in the aggregated packet based on their associated hop count. The second portion of the incoming packets is sent separately to a destination node.

Example Embodiments

Figure 1:
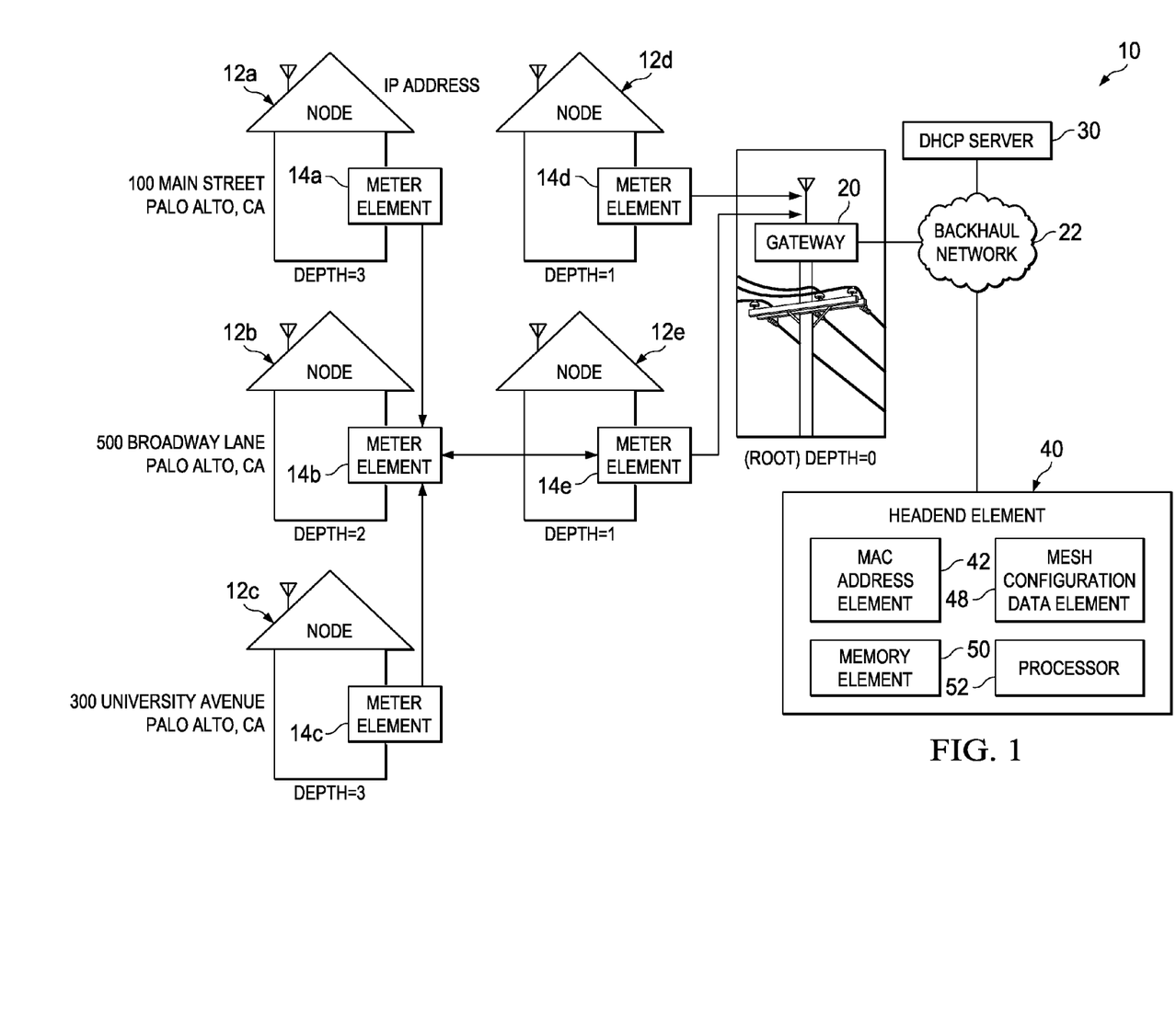
FIG. 1 is a simplified block diagram of a communication system for optimizing packet routing in a mesh network in accordance with one example embodiment of the present disclosure.

Turning to FIG. 1, FIG. 1 is a simplified block diagram of a communication system 10 for optimizing packet routing in a mesh network. FIG. 1 includes multiple nodes 12a-e that are representative of residential customers in a neighborhood environment. Each node 12a-e includes a respective meter element 14a-e that is configured to track power consumption for that particular customer. In this particular example, a number of different addresses are provided for several of the nodes, where each of nodes 12a-e is illustrated as having a respective depth with respect to the root node, which is detailed below. The particular architecture of FIG. 1 can be associated with a wireless local area network (WLAN) configuration, or alternatively it can represent any other type of network configuration associated with a mesh topology such as power line communication (PLC), etc.

FIG. 1 also includes a gateway 20, which is configured to serve as the root to different hosts that are represented as nodes 12a-e. Collectively, the hosts in this particular example are indicative of self-forming mesh networks. Each of nodes 12a-e is configured to communicate data to each other, and to communicate data to the root. Additionally, each of nodes 12a-e has intelligence to advertise a number of hops necessary to reach the root (i.e., gateway 20 in this example implementation). In this particular instance, nodes 12d-e having a depth of one (1) can readily connect with gateway 20, which serves as their root. Hence, nodes 12d-e are one hop away from their root.

Gateway 20 is coupled to a backhaul network 22 that can be accessed by a dynamic host configuration protocol (DHCP) server 30, which can provision (or otherwise manage) network addresses for nodes 12a-e. Additionally, backhaul network 22 provides a pathway for a headend element 40, which may be associated with a supervisory control and data acquisition (SCADA) infrastructure. Headend 40 may further include a media access control (MAC) address element 42, a mesh configuration data element 48, a memory element 50, and a processor 52. Headend element 40 can be thought of as a network operating center for the mesh architecture: capable of providing network management functions.

Semantically, communication system 10 can include multiple residential, commercial, or industrial consumers: each of which include a respective meter element 14a-e. Each meter element 14a-e can be configured to track power consumption from any suitable source. For example, each meter element 14a-e may interface with an electric grid, where the source of power can include conventional energy sources (e.g., nuclear, coal, gas, etc.), renewable energy sources (e.g., windmills, solar panels, geothermal mechanisms, biofuels, hydroelectricity, etc.), or any other suitable energy supply. The electric grid may include power generation mechanisms, transmission lines, transmission substations, distribution lines, distribution substations, etc. that can coordinate/manage power generation and power distribution for consumers shown in communication system 10.

Certain elements of FIG. 1 may couple to one another through suitable interfaces (wired or wireless), transmission and/or distribution lines, or through any other appropriate connection that provides a viable pathway for packet communications. Additionally, any one or more of the elements of FIG. 1 may be combined or removed from the architecture based on particular mesh configuration needs. Additionally, certain components of communication system 10 may include a configuration capable of transmission control protocol/internet protocol (TCP/IP) communications for the transmission or reception of packets in a network. Communication system 10 may also operate in conjunction with a user datagram protocol/IP (UDP/IP) or any other suitable protocol or tunneling technique, where appropriate and based on particular needs. Legacy non-IP protocols over separate wires, over power lines (over wireless components, etc.) may be similarly utilized.

For purposes of illustrating certain example techniques of communication system 10, it is important to understand the problematic areas that are prominent in mesh networks. The following foundational information may be viewed as a basis from which the present disclosure may be properly explained. Typically, a wireless mesh network is a communications network made up of radio nodes organized in a mesh topology. Wireless mesh networks often consist of mesh clients, mesh routers, and gateways. The mesh clients are often laptops, cell phones, smartphones, computers, sensors, utility meters, and other wired (e.g., PLC) or wireless devices, where mesh routers forward traffic to/from the gateways. The coverage area of the radio nodes (working as a single network) is sometimes called a mesh cloud. Access to the mesh cloud is dependent on the radio nodes working in harmony with each other to create a radio network. At least in theory, a mesh network is reliable and, further, offers redundancy. When one node can no longer operate, the rest of the nodes can still communicate with each other directly, or through one or more intermediate nodes.

Multi-hop wireless mesh networks are popular because of their self-healing properties and, further, because such networks are easy to install and to provision. In operation, mesh networks provide long-range connectivity by relaying packets from one mesh node to another (e.g., much like a bucket brigade protocol). The end of the bucket brigade terminates at the root, which typically connects to the Internet, to an Ethernet link, etc. Additionally, relays connect to the root (or to other relay nodes) to form a wirelessly linked chain.

Hence, the root typically has a wired uplink, where its backhaul is some type of wired network. Relays have wireless uplinks through an upstream downlink radio. Downlink radios operate as access points (e.g., systematically sending out beacons), whereas uplink radios operate as clients. From the user perspective, a wireless radio card (e.g., in a laptop computer, in a smartphone, etc.) can inform an individual of the presence of downlinks. Collectively, the uplink and downlink radios form a wireless backhaul path.

One important goal in WLAN mesh networks has been to select the best path between source and destination nodes to maximize throughput. In WLAN mesh networks that deploy transmission bit rate adaptation, the longer distance link has a lower received signal power and a lower transmission bit rate. That is, the basic path selection method of minimizing the hop count tends to contain long-distance links that have low transmission bit rates and, thus, may result in poor throughput. To counter this problem, radio-aware routing metrics that consider the signal-to-noise power ratio (SNR), the bit error rate (BER), the packet error rate (PER), and the transmission bit rate have been proposed, but such proposals have experienced limited success.

For example, the expected transmission count (ETX) metric has been used in an attempt to minimize the expected total number of packet transmissions required to successfully deliver packets to the destination node. However, because the ETX does not consider the effect of transmission bit rates of wireless links, it does not perform as well in environments with differing transmission bit rates. Modification of the expected transmission time (ETT), which considers the transmission bit rates of wireless links, has similarly been proposed, but met with mixed results. Note that the IEEE 802.11(s) framework deploys an airtime routing metric that is based on the ETT, along with the additional consideration of the channel access and the protocol overhead in order to reflect the amount of channel resources consumed by transmitting the data packet over a wireless link. However, such a tactical approach fails to consider some of the inherent problems with mesh network packet routing.

Logistically, when intermediate nodes are available, mesh architectures can enhance signal strength, and hence improve the associated SNR and BER, by breaking long distances into a series of shorter hops. Intermediate nodes not only boost the signal, but also cooperatively make forwarding decisions based on their knowledge of the network (i.e., perform routing). In multi-hop networks, a packet may traverse multiple wireless nodes and at each one of these nodes the packet could be potentially dropped, resulting in a need to retransmit the packet by the originating node. Each time a packet traverses a wireless segment, it consumes system resources (power, bandwidth, etc.). The greater the number of nodes a packet has traversed before it is dropped, the more resources it will subsequently consume when it is retransmitted.

This characteristic of multi-hop mesh networks creates an opportunity for an architecture that could automatically modify/adapt the treatment of packets as they traverse through a mesh network. The adaptive behavior should minimize the number of retransmitted packets that have traveled the greatest number of hops, as well as optimize the utilization of system resources. A wireless mesh network (with careful design) can provide a high-bandwidth solution having spectral efficiency over the coverage area.

Example embodiments of communication system 10 can manage packet traffic based on the number of hops a given packet has traversed. More specifically, packets that have traversed a higher number of hops can be treated preferentially. This would optimize the mesh node retry rate and, further, significantly reduce the retry rate. It should be understood that, inevitably, certain packets have to be dropped under normal networking conditions. However, not all packets have the same characteristics, nor have they traveled along the same pathways. Hence, there should be an intelligent selection about which packets would be better candidates for possibly being discarded.

Communication system 10 can readily identify the number of hops traversed by a given packet such that the packets that traversed the greatest number of hops can be given priority over competing packets. Moreover, any number of methods can be used to provide preferential treatment for packets having already traversed multiple wireless segments. Each one of the following methods should be considered as a separate embodiment of the present disclosure. Moreover, communication system 10 can employ any one of the methods described below, or any combination of these methods can be employed.

In one particular example method, each meter element 14a-e can be configured to evaluate incoming packets and, further, designate the number of retransmissions as being proportional to the number of hops traversed by the packet. This analysis would occur prior to any decision associated with dropping a packet. In another example implementation, as buffers within each meter element 14a-e overflow, packets would be dropped if their inherent characteristics were indicative of a least number of hops being traveled. Hence, when dropping packets in nodes 12a-e (e.g., as buffers overflow) packets that traveled the least number of hops would be systematically discarded. As a corollary, in accordance with an example implementation each meter element 14a-e would queue packets (in respective buffers for transmission) that have traversed a greater number of hops ahead of packets that have traversed a lower number of hops.

In specific product implementations (e.g., involving concentrator products), multiple packets traveling to the same application in the headend may be aggregated at headend element 40. Hence, multiple packets are provided in a larger packet in order to increase the efficiency of the network. The increased size of such an aggregated packet may increase the susceptibility of the aggregated packet to errors, retries, etc. As part of the enhanced evaluation of packet hop counts, communication system 10 may also elect to eliminate this aggregation mechanism. Instead, an incoming packet that traversed multiple hops can be sent separately (i.e., with lower efficiency) in order to increase the probability that this packet successfully arrives at the next node in the mesh network.

Note also that the TCP/IP framework commonly uses a retransmission timer that is based on round-trip delay for determining when an acknowledgment should be received. In accordance with yet another embodiment of communication system 10, the initial window length (i.e., in seconds) can be set adaptively based on the number of hops between a given node 12a-e and a corresponding application (e.g., potentially associated with headend 40). This cross-layer design can lead to passing the hop count from the mesh layer-2 (L2) to a TCP/IP layer in order for the TCP/IP layer to use this parameter in setting the initial value of the retransmission timer.

Any number of advantages can be achieved by certain embodiments of the present disclosure. For example, the number of hops a specific packet traversed through the network is readily available and, by leveraging this easily accessible parameter, the operations of a mesh network can be quickly optimized. Moreover, communication system 10 reduces the global number of retries in the architecture. Additionally, the mesh network makes optimal use of mesh resources (radio frequency (RF) links, buffers, power (e.g., a battery), etc.). In a separate endeavor, the architecture of communication system 10 offers a relative improvement in end-to-end latency of higher-level applications.

Note that several MAC layer mechanisms and routing protocols are often employed to handle congestion in multi-hop mesh networks. MAC layer mechanisms are typically enhancements to IEEE 802.11e Enhanced Distributed Channel Access (EDCA). This paradigm defines four access categories, and it also assigns different interframe spacing and contention window size for the different access categories. One example approach relates to adaptive per-hop differentiation (APHD), which focuses on optimizing end-to-end delay. This may use a number of hops traversed as one criterion to determine which packets get priority access on the network. Other schemes can use EDCA to dynamically modify the rate of traffic sent to the network. Routing protocols typically focus on the most efficient methods to route a packet to its intended destination. Some of these routing protocols may use hop count as a routing metric. In contrast to these configurations, communication system 10 offers an optimal utilization of mesh system resources by controlling and by adapting packet management parameters (e.g., queue management) to reduce the global number of retransmissions in the mesh network. Certain examples of these activities (and others) are discussed below. Before turning to additional details associated with the example activities of communication system 10, a brief overview is provided about the possible configuration of each of nodes 12a-e.

Note that, in particular examples, each meter element 14a-e may be part of (or in communication with) a home energy controller (HEC), or a home energy management system (e.g., that is enabled by the smart grid). Each meter element 14a-e may also be part of an extension to a smart meter device. Additionally, each meter element 14a-e may be part of a computer system (or a proprietary system) or a smart green energy system, which assists in coordinating activities related to power transmission and/or smart grid activities. In one particular paradigm, FIG. 1 is representative of residential consumers proximate to each other such that packet propagation is possible using mesh network protocols. This can include relaying packets between meter elements 14a-e. As a related note, each respective meter element 14a-e (or the node itself) can be provisioned with a respective network address (e.g., a MAC address, an IP address, etc.). The network addresses may be used as a basis for billing particular consumers for network service, energy consumption, or any other suitable parameter. The network addresses can be managed or otherwise coordinated through DHCP server 30 and/or MAC address element 42.

In one particular instance, nodes 12a-e are configured to exchange data in a network environment such that the packet management functionality discussed herein is achieved. Note that each respective meter element 14a-e may be equipped for such packet propagation, or infrastructure within nodes 12a-e can be used for facilitating packet propagation. Accordingly, as used herein in this Specification, the term 'node' is meant to encompass various types of infrastructure found at particular nodes. Hence, each node 12a-e can be inclusive of respective meter elements 14a-e, computers, smartphones, iPads, laptops, routers, switches, gateways, bridges, loadbalancers, firewalls, servers, inline service nodes, proxies, processors, modules, or any other suitable device, component, element, or object operable to exchange information in a network environment. Each node 12a-e may include appropriate processors, memory elements, hardware and/or software to support (or otherwise execute) the activities associated with packet management in a wireless mesh network, as outlined herein. Moreover, each node 12a-e may include any suitable components, modules, interfaces, or objects that facilitate the operations thereof. This may be inclusive of appropriate algorithms and communication protocols that allow for the effective exchange of data or information.

In a specific implementation, nodes 12a-e include software to achieve (or to foster) the packet management operations, as outlined herein in this document. For example, this could include a depth based QoS module 74 (shown in FIG. 3), which can be configured to execute many of the activities discussed herein with respect to packet management functions. Furthermore, in one example, nodes 12*a-e* can have an internal structure (e.g., have a processor, a memory element, etc.) to facilitate some of the operations described herein. In other embodiments, all of these packet management features may be provided externally to these elements or included in some other location to achieve this intended functionality. Alternatively, any other network element can include this software (or reciprocating software) that can coordinate with nodes 12*a-e* in order to achieve the operations, as outlined herein.

Figure 2:
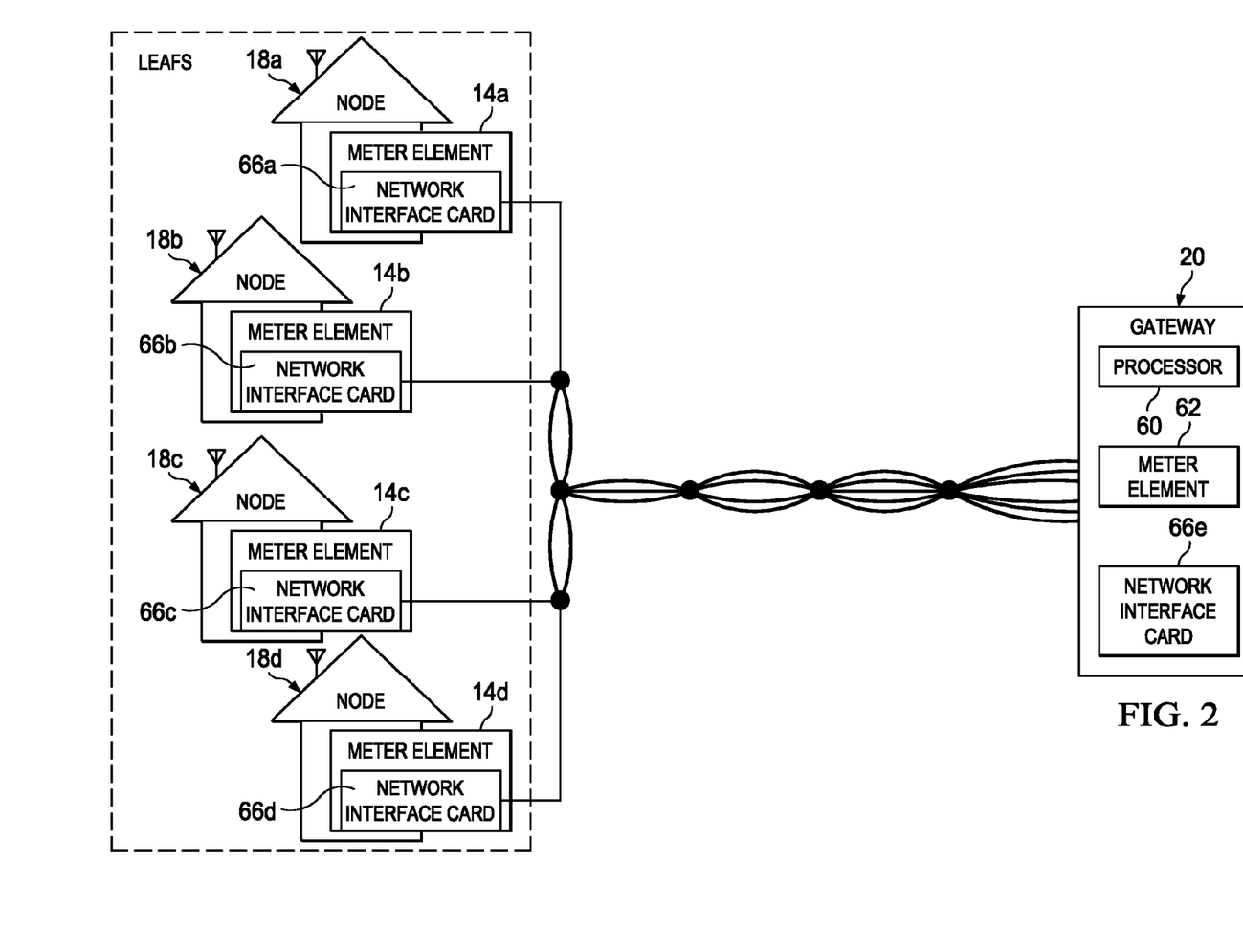
FIG. 2 is a simplified block diagram of an example tree structure associated with a mesh network in accordance with one embodiment of the present disclosure.

Turning to FIG. 2, FIG. 2 is a simplified block diagram illustrating some of the relationships that may exist between a set of nodes 18*a-d* and gateway 20. The arrangement of FIG. 2 can be viewed as a tree structure in which each of nodes 18*a-d* are leafs that connect back to gateway 20 (i.e., their root). In a general sense, a parent-child relationship exists between gateway 20 and the other nodes 18*a-d*. Each of nodes 18*a-d* can serve as a child and as a parent for other nodes. Gateway 20 has no parent, and it has suitable (direct) connections to each of the nodes that have a depth of one.

In this particular configuration of FIG. 2, each node 18*a-d* includes a respective network interface card (NIC) 66*a-d*. Gateway 20 includes NIC 66*e*, a processor 60, and a memory element 62 in this particular example. At least in a general sense, FIG. 2 is illustrative of the possible aggregation issues that are present in mesh networks, as packets are relayed from one node to another node. During packet propagation, the consumption of resources would accumulate at each node. Larger circles are being depicted in FIG. 2 to illustrate nodes that would be traversed by the packets. As is being depicted, the amount of resources increases as each segment in the pathway is traversed. For these reasons, retransmissions associated with longer pathways should be given preference over shorter pathways in which lesser resources have been expended to move that particular packet to a next network node. Note that as used herein in this Specification, the broad term 'preference' is meant to include any type of priority, hierarchy, precedence, superiority, displacement, or exalted assignment given to a particular packet, which propagates in the mesh network. This preference can readily implicate quality of service (QoS) routing in more specific implementations.

Figure 3:
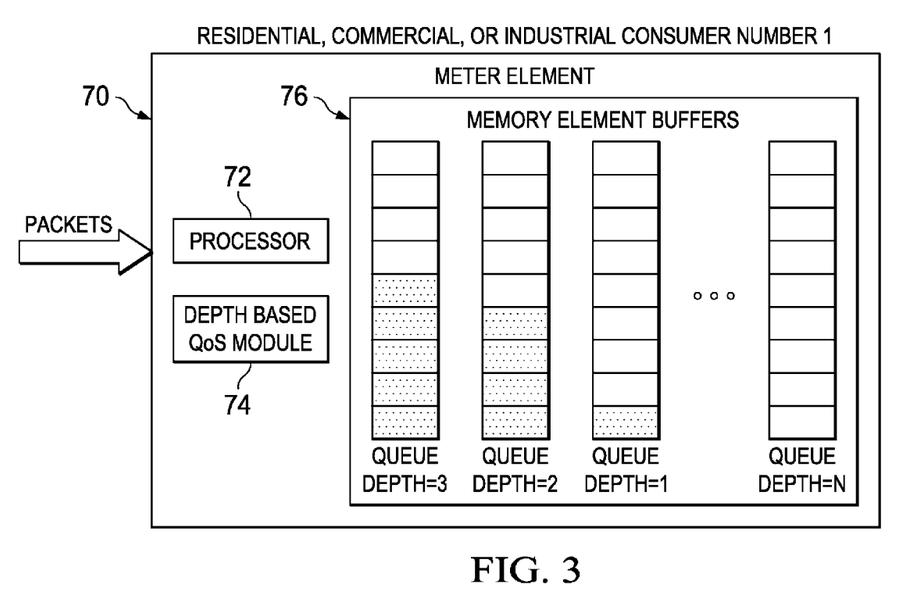
FIG. 3 is a simplified block diagram of an example meter element associated with a mesh network in accordance with one embodiment of the present disclosure.

FIG. 3 is a simplified block diagram illustrating one potential arrangement of a meter element 70 associated with a residential, commercial, or industrial consumer #1. Meter element 70 includes a processor 72, a depth based QoS module 74, and a memory element 76. Memory element 76 includes multiple buffers having certain queues with various depths (e.g., depth=3, depth=2, depth=1, etc.).

Note that there is a certain amount of energy/resources required to forward a packet from one node to the next. In a general sense, there is a certain investment in packet propagation, where packets traverse multiple hops. As discussed previously, congestion is a routine problem for wireless mesh networks. Additionally, there is limited buffer space in any given node such that in times of congestion, the buffers can quickly overflow. This forces a decision about which packets should be kept and which packets should be discarded. In order to increase the efficiency of the network, the depth (i.e., the associated hop count) is evaluated (e.g., using depth based QoS module 74) in order to make an intelligent decision about which packets should be forwarded or discarded.

For example, if the initial depth of a node were at one (1), this would signify that the particular node is one hop away from the root (e.g., the gateway). A corresponding packet originating at that node would only have to be retransmitted once (if it were previously discarded) to reach the gateway (i.e., consume the power, airwaves and the resources between that particular node and the gateway). Hence, discarding such a packet would result in a limited retransmission to deliver the packet to the intended root. However, if that same node had packets that have traveled five (5) hops, ten (10) hops, etc., then the mesh network would have to retransmit those packets through a series of nodes again. The discarding of these packets (which originated from a greater depth) would consume significantly more resources. Communication system 10 effectively addresses this issue by properly managing packet queues based on hop count characteristics.

Note that in existing systems, there is typically a single queue that arbitrarily sends packets to a suitable next destination. In contrast to these operations, the incoming packets being received by meter element 70 are queued in accordance with a depth associated with each packet. In this particular implementation depicted in FIG. 3, multiple queues are being illustrated corresponding to a number of suitable depths. By giving preferential treatment to queues of messages originating from a greater depth, the delay across all packets can be normalized (i.e., equalized on a relative basis). Note that any type of buffer overflow condition can be used as a trigger for flushing packets. This condition can be associated with certain buffer thresholds, designated buffer volumes, or any other suitable buffer or queue parameter that could trigger this activity.

Figure 4:
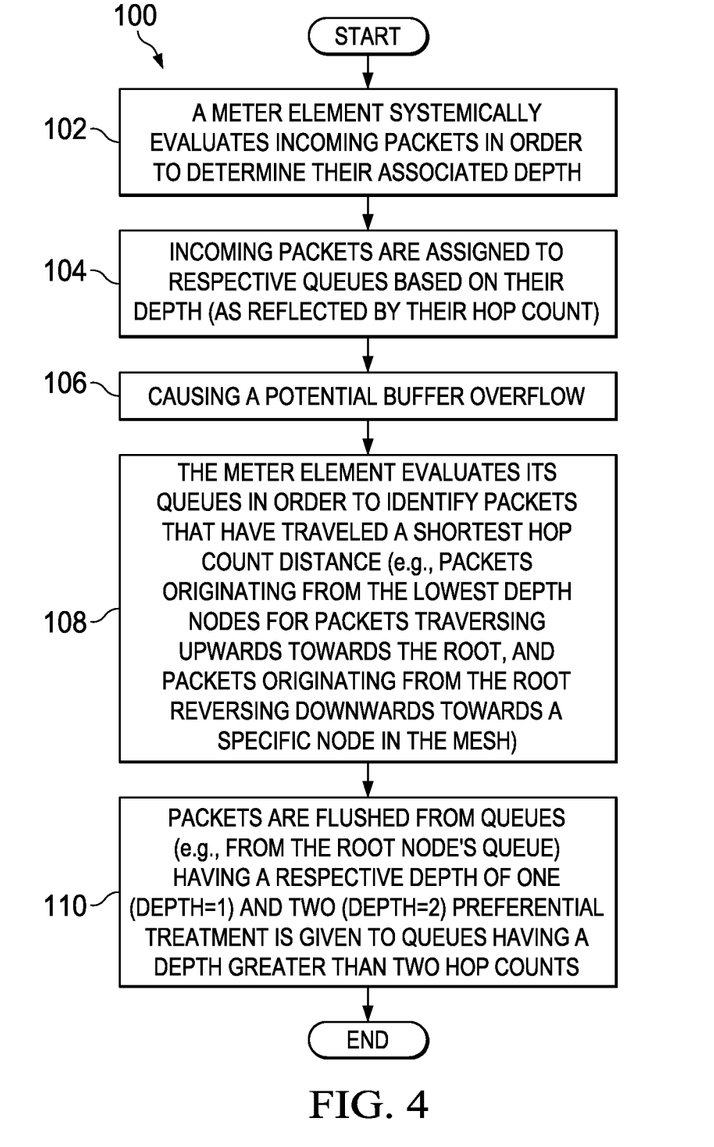
FIG. 4 is a simplified flowchart illustrating an example operational flow involving the communication system for optimizing packet routing in a mesh network in accordance with one embodiment of the present disclosure.

FIG. 4 is a simplified flowchart 100 illustrating an example operational flow involving communication system 10 for optimizing packet routing in a mesh network in accordance with one embodiment of the present disclosure. The flow may begin at 102 where meter element 70 is configured to systematically evaluate incoming packets in order to determine their associated depth. At 104, incoming packets are sent (e.g., assigned, relegated, directed, etc.) to respective queues based on their depth (as reflected by their hop count). At 106, congestion forms in the mesh network due to high traffic incurred causing a potential buffer overflow.

At 108, meter element 70 evaluates its queues in order to identify packets that have traveled a shortest hop count distance (e.g., packets originating from the lowest depth nodes for packets traversing upwards towards the root, and packets originating from the root traversing downwards towards a specific node in the mesh). At 110, packets are flushed from queues (e.g., from the root node's queue) having a respective depth of one (depth=1) and two (depth=2). Please note that reference to the root is indicative of messages from a depth of one (1) being seen/received in the root. However, the architecture of communication system 10 equally applies to nodes at greater depth and not only to the root node.

In this example of FIG. 4, the greater the depth from the root, the higher the priority that is assigned to that corresponding packet that traverses upwards towards the root. In this instance, preferential treatment is given to queues having a depth greater than two (i.e., preference is given based on the number of hops traversed by particular packets). Those higher-hop count packets consume the most power, time, and resources in the network because they travel the greatest distance. Hence, they are properly accorded preference in this scenario because if they were to be dropped, considerable resources would be required to retransmit these packets. The architecture of communication system 10 is more intelligent in its assessment of which packets should be dropped based on hop count metrics. In accordance with yet other example embodiments, packets are accordingly marked to indicate whether they originated from (or traversed through) a battery or from the electric grid powered node. In the case of a potential buffer overflow condition being detected, the system can provide preferential treatment to packets originating from (or traveling through) a battery-operated node, as to minimize overall system battery power consumption.

Note that in certain example implementations, the packet management functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in the FIGURES] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in the FIGURES] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, each meter element 14*a-e* and/gateway 20 may include software in order to achieve the packet management functions outlined herein. These activities can be facilitated by depth based QoS module 74, which can be provided as software, or/and as hardware within their respective devices. Both headend element 40, gateway 20, and/or meter elements 14*a-e* can include memory elements for storing information to be used in achieving the intelligent packet management activities, as outlined herein. Additionally, headend element 40, gateway 20, and/or meter elements 14*a-e* may include a processor that can execute software or an algorithm to perform the packet management activities, as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., queue, buffer, database, lookup table, cache, etc.) should be construed as being encompassed within the broad term 'memory element.' Similarly, any of the potential processing elements, modules, and machines described in this Specification should be construed as being encompassed within the broad term 'processor.' Each of meter elements 14*a-e*, gateway 20, and headend 40 can also include suitable interfaces for receiving, transmitting, and/or otherwise communicating data or information in a network environment.

Note that with the example provided above, as well as numerous other examples provided herein, interaction may be described in terms of two, three, or four elements. Similarly, packet management functions that were described as being executed by a single element (such as a single meter element) may be performed by multiple elements (e.g., meter elements operating in conjunction with a computer system at a given node 12*a-e* and gateway 20). However, this has been done for purposes of clarity and example only. In certain cases, it may be easier to describe one or more of the functionalities of a given set of flows by only referencing a limited number of elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures. Please note that gateway 20 can be part of the mesh network, but it represents a special member of the mesh, as it also has an uplink (wired or wireless) WAN link.

It is also important to note that the operations in the preceding flow diagrams illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Additionally, although the previous discussions have outlined multiple distinct queues, this was done for illustrative purpose only. The multiple queues are meant only as virtual queues, which can readily be implemented in a single memory queue arrangement. There is considerable breadth and flexibility associated with such queue implementations being deployed in communication system 10. Similarly, the terms 'queue' and 'buffer' should be construed as simply connoting memory elements at which packets can be stored for any suitable length of time. For this reason, these terms are interchangeable and, further, these elements can be provided in conjunction with each other, provisioned as subsets of each other, or one may be used in place of the other.

Moreover, although the present disclosure has been described in detail with reference to particular arrangements and configurations, these example configurations and arrangements may be changed significantly without departing from the scope of the present disclosure. For example, although the present disclosure has been described with reference to particular exchanges involving energy components of a smart grid, an electric grid, etc., communication system 10 may be applicable to other types of sensory and control systems such as water, gas, etc., and arrangements such as any type of electricity network or, more generally, a power environment in which packet propagation occurs over mesh networks. For example, communication system 10 can be applicable to other power environments, such as those encountered in charging stations, large-scale energy storage, power line communications, the smart grid, the SuperSmart Grid, the Super grid, the Unified Smart Grid (USA), a Vehicle-to-grid (V2G) architecture, etc. Moreover, communication system 10 can be deployed in traditional mesh networks that do not involve smart grid, or electric grid applications. In such instances, the packet management operations discussed herein can readily be adopted by a given mesh network to improve performance.

In addition, the described WLAN environment can be replaced by any IP network, home area network (HAN), field area network (FAN), local area network (LAN), metropolitan area network (MAN), Intranet, Extranet, wide area network (WAN), virtual private network (VPN), or any other appropriate architecture or system that facilitates communications in a network environment. Additionally, communication system 10 is applicable to mesh over wired connections (e.g., PLC and the backhaul can be done over radio, WiMAX, long-term evolution (LTE), cellular, G3, G4, etc.).

Communication system 10 can be implemented using any standard or proprietary protocols, and the data can be transferred over a dedicated wire network, via wireless, radio, or using the power lines themselves via power line communications (PLC), broadband over power line (BPL) communication links, etc. Moreover, the present disclosure is equally applicable to various green technologies in which packet propagation may be present. Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    receiving a first packet and a second packet that propagate in a mesh network;
    evaluating hop count metrics associated with the first packet and the second packet;
    sending the first packet to a first queue and the second packet to a second queue, wherein the first queue is associated with a first hop count detected in the first packet, and the second queue is associated with a second hop count detected in the second packet;
    identifying a buffer overflow condition;
    discarding the second packet based on the second hop count being less than the first hop count;
    receiving a plurality of incoming packets; and
    designating a number of retransmissions associated with the plurality of incoming packets in proportion to a number of hops traversed in the mesh network by the plurality of incoming packets.

2. The method of claim 1, further comprising:
    receiving additional incoming packets; and
    communicating hop count information associated with the incoming packets in order to set an initial value of a retransmission timer for the incoming packets.

3. The method of claim 2, wherein the hop count information is communicated from a mesh layer-2 (L2) to a transmission control protocol/Internet Protocol (TCP)/(IP) layer.

4. The method of claim 1, further comprising:
    receiving additional incoming packets; and
    providing a first portion of the incoming packets into an aggregated packet, wherein a second portion of the incoming packets is not included in the aggregated packet based on their associated hop count, and wherein the second portion of the incoming packets is sent separately to a destination node.

5. The method of claim 1, further comprising:
    receiving additional incoming packets; and
    designating a number of retransmissions associated with the incoming packets based on whether the incoming packets originated from or traversed through a battery operated node.

6. The method of claim 1, further comprising:
    receiving additional incoming packets;
    marking a subset of the incoming packets based on whether the incoming packets originated from or traversed through a battery operated node; and
    providing a preferential treatment to the subset of the incoming packets marked as originating from or traversing through the battery operated nodes.

7. Non-transitory tangible media that includes code for execution and when executed by a processor operable to perform operations comprising:
    receiving a first packet and a second packet that propagate in a mesh network;
    evaluating hop count metrics associated with the first packet and the second packet;
    sending the first packet to a first queue and the second packet to a second queue, wherein the first queue is associated with a first hop count detected in the first packet, and the second queue is associated with a second hop count detected in the second packet;
    identifying a buffer overflow condition;
    discarding the second packet based on the second hop count being less than the first hop count;
    receiving a plurality of incoming packets; and
    communicating hop count information associated with the plurality of incoming packets in order to set an initial value of a retransmission timer for the plurality of incoming packets.

8. The media of claim 7, wherein the operations further comprise:
    receiving additional incoming packets; and
    designating a number of retransmissions associated with the incoming packets in proportion to a number of hops traversed in the mesh network by the incoming packets.

9. The media of claim 7, wherein the hop count information is communicated from a mesh layer-2 (L2) to a transmission control protocol/Internet Protocol (TCP)/(IP) layer.

10. The media of claim 7, wherein the operations further comprise:
    receiving additional incoming packets; and
    providing a first portion of the incoming packets into an aggregated packet, wherein a second portion of the incoming packets is not included in the aggregated packet based on their associated hop count, and wherein the second portion of the incoming packets is sent separately to a destination node.

11. The media of claim 7, wherein the operations are further comprise:
    receiving additional incoming packets; and
    designating a number of retransmissions associated with the incoming packets based on whether the incoming packets originated from or traversed through a battery operated node.

12. An apparatus, comprising:
a memory element configured to store electronic code;
a processor operable to execute instructions associated with the electronic code; and
a depth based module configured to interface with the processor such that the apparatus is configured for:
   receiving a first packet and a second packet that propagate in a mesh network;
   evaluating hop count metrics associated with the first packet and the second packet;
   sending the first packet to a first queue and the second packet to a second queue, wherein the first queue is associated with a first hop count detected in the first packet, and the second queue is associated with a second hop count detected in the second packet;
   identifying a buffer overflow condition;
   discarding the second packet based on the second hop count being less than the first hop count;
   receiving a plurality of incoming packets; and
   designating a number of retransmissions associated with the plurality of incoming packets based on whether the plurality of incoming packets originated from or traversed through a battery operated node.

13. The apparatus of claim 12, wherein the apparatus is further configured for:
   receiving additional incoming packets; and
   designating a number of retransmissions associated with the incoming packets in proportion to a number of hops traversed in the mesh network by the incoming packets.

14. The apparatus of claim 12, wherein the apparatus is further configured for:
   receiving additional incoming packets; and
   communicating hop count information associated with the incoming packets in order to set an initial value of a retransmission timer for the incoming packets.

15. The apparatus of claim 14, wherein the hop count information is communicated from a mesh layer-2 (L2) to a transmission control protocol/Internet Protocol (TCP)/(IP) layer.

16. The apparatus of claim 12, wherein the apparatus is further configured for:
   receiving additional incoming packets; and
   providing a first portion of the incoming packets into an aggregated packet, wherein a second portion of the incoming packets is not included in the aggregated packet based on their associated hop count, and wherein the second portion of the incoming packets is sent separately to a destination node.

17. The apparatus of claim 12, wherein the apparatus further configured for:
   receiving additional incoming packets;
   marking a subset of the incoming packets based on whether the incoming packets originated from or traversed through a battery operated node; and
   providing a preferential treatment to the subset of the incoming packets marked as originating from or traversing through the battery operated nodes.

* * * * *